United States Patent
Scoda

(10) Patent No.: US 10,218,775 B2
(45) Date of Patent: Feb. 26, 2019

(54) METHODS FOR SERVICING WEB SERVICE REQUESTS USING PARALLEL AGILE WEB SERVICES AND DEVICES THEREOF

(71) Applicant: Usablenet Inc., New York, NY (US)

(72) Inventor: Enrico Scoda, Martignacco (IT)

(73) Assignee: UsableNet Inc., New York, NY (US)

(*) Notice: Subject to any disclaimer, the term of this patent is extended or adjusted under 35 U.S.C. 154(b) by 620 days.

(21) Appl. No.: 14/012,051

(22) Filed: Aug. 28, 2013

(65) Prior Publication Data
US 2015/0067013 A1 Mar. 5, 2015

(51) Int. Cl.
*G06F 15/16* (2006.01)
*H04L 29/08* (2006.01)

(52) U.S. Cl.
CPC .............. *H04L 67/10* (2013.01); *H04L 67/02* (2013.01); *H04L 67/2823* (2013.01); *H04L 67/1002* (2013.01)

(58) Field of Classification Search
CPC ..... H04L 67/10; H04L 67/02; H04L 67/2823; H04L 67/1002
USPC ........ 709/201, 218, 219, 224, 208; 711/154, 711/146; 370/401; 455/414.1
See application file for complete search history.

(56) References Cited

U.S. PATENT DOCUMENTS

| | | | | |
|---|---|---|---|---|
| 6,243,762 B1* | 6/2001 | Greene | ................. | G06F 9/5016 718/106 |
| 9,659,080 B1* | 5/2017 | Drobychev | ....... | G06F 17/20598 706/610 |
| 2002/0116587 A1* | 8/2002 | Modelski | ................ | G06F 13/36 711/154 |
| 2005/0048954 A1* | 3/2005 | Gortz | ................. | G09B 19/0061 455/414.1 |
| 2006/0080405 A1* | 4/2006 | Gibson | ............. | G06F 17/30884 709/218 |
| 2007/0179931 A1* | 8/2007 | Juby | ................. | G06F 17/30345 |
| 2008/0080530 A1* | 4/2008 | Kaler | .................... | G06F 9/5061 370/401 |
| 2010/0031233 A1* | 2/2010 | Li | ........................... | G06F 9/541 717/106 |
| 2011/0078703 A1* | 3/2011 | Dokovski | ......... | G06F 17/30884 719/315 |
| 2011/0154376 A1* | 6/2011 | Consul | ............. | G06F 17/30861 719/328 |
| 2011/0307238 A1* | 12/2011 | Scoda | ............... | G06F 17/30905 703/26 |

(Continued)

OTHER PUBLICATIONS

Kut et al., "An Approach for Parallel Execution of Web Services," Proceedings of the IEEE International Conference on Web Services (ICWS'04).

(Continued)

*Primary Examiner* — Thuong Nguyen
(74) *Attorney, Agent, or Firm* — LeClairRyan PLLC

(57) ABSTRACT

A method, non-transitory computer readable medium, and web content management server device that sends each of a plurality of jobs requiring execution in order to service a received web service request to one of a plurality of slave web services configured to execute the plurality of jobs in parallel. A response from each of the plurality of slave web services is received. A web service response is generated based on the received responses. The generated web service response is provided in response to the received web service request.

12 Claims, 4 Drawing Sheets

(56) References Cited

U.S. PATENT DOCUMENTS

| | | | |
|---|---|---|---|
| 2012/0198466 A1* | 8/2012 | Cherkasova | G06F 9/5066 718/104 |
| 2012/0246190 A1* | 9/2012 | Surtani | G06F 17/30575 707/769 |
| 2012/0331110 A1* | 12/2012 | Scoda | G06F 9/541 709/219 |
| 2013/0263142 A1* | 10/2013 | Miyamae | G06F 9/5033 718/102 |
| 2013/0297788 A1* | 11/2013 | Itoh | G06F 17/30073 709/224 |
| 2014/0019569 A1* | 1/2014 | Sharma | G06F 9/5066 709/208 |
| 2014/0029442 A1* | 1/2014 | Wallman | H04L 69/22 370/241.1 |
| 2014/0380261 A1* | 12/2014 | Bickford | G06F 17/5009 716/136 |
| 2015/0067013 A1* | 3/2015 | Scoda | H04L 67/10 709/201 |
| 2016/0042046 A1* | 2/2016 | Whitehead | G06F 17/30578 707/640 |

OTHER PUBLICATIONS

Elzinga, E., "Oracle Service Bus, Implementing Aggregator Pattern by Use of Split-Join," retrieved at http://www.xenta.nl/blog/2011/07/03/oracle-service-bus-implementing-aggregator-pattern-by-use-of-split-join/ (Jul. 3, 2011).

Extended European Search Report for corresponding European Patent Application 14182403.7 dated Feb. 23, 2015.

* cited by examiner

```
Receive with One of the Slave Web Services One of the Jobs 300
                            ↓
Retrieve with the Slave Web Service Content Satisfying the Job 302
                            ↓
Generate with the Slave Web Service a Response Including the Content 304
                            ↓
Returning with the Slave Web Service the Response 306
```

FIG. 3

```
var batch = [];
for (var i=0; i<pages; i++) {
    result.push(null);
    var o = {
        'service': 'catalogue-p-plp',
        'params': {'url': pages[i]},
        'cache': '1d',
        'retryTimeouts': 5,
        'success': 'counter',
        'failure': 'generic'
    }
    batch.push(o);
} ws.executeBatch({
    'threads': 10,
    'batch': batch,
    'success': {
        'counter': function(index, obj) {
            result[index] = obj;
        }
    },
    'failure': {
        'generic': function(index, status) {
            ws.response.error("Error on page " + index + " " + status);
        }
    }
});
```
400

FIG. 4

```
function service (ws) {
    jse.settings.httpTimeout = 30;
    var url = ws.request.params['url'];
    if (url) {
        ws.load (url, function (ws, xhr) {
            ws.response = JSON.stringify({
                'title': $('title')
            });
        }, function (ws, xhr) {
            ws.response.error(xhr.status, xhr.statusText);
        });
    }
}
```
500

FIG. 5

```
<access_control>
    <global-rule protocols="https">
    </global-rule>
    <rule for="catalogue-p-pip" role="slave"/>
</access_control>
```
600

FIG. 6

METHODS FOR SERVICING WEB SERVICE REQUESTS USING PARALLEL AGILE WEB SERVICES AND DEVICES THEREOF

FIELD

This technology generally relates to methods and devices for optimizing delivery of web content and, more particularly, to methods for servicing web service requests using parallel agile web services and devices thereof.

BACKGROUND

Web services provide a standardized way of integrating web-based applications traditionally using eXtensible Markup Language (XML), SOAP, Web Services Description Language (WSDL), and/or Universal Description Discovery, for example, and Integration (UDDI) standards over an Internet Protocol (IP) backbone. XML can be used to tag data used by a web service, SOAP can be used to transfer the data, WSDL can be used for describing the web services available, and UDDI can be used for listing the available web services. Web services allow different applications located at different sources to communicate with each other efficiently and without custom coding which can require a significant amount of resources. Additionally, because communications can be in XML, web services are not tied to any operating system or programming language. Recently, JavaScript Object Notation (JSON) has emerged as a standard object-based messaging format alternative to XML that can be used with the Hypertext Transfer Protocol (HTTP) to generate web services for web applications.

Unlike traditional client/server models, web services do not provide an end user with a graphical user interface (GUI). Instead, web services share data and processes through an application interface across a network. These application interfaces are invoked and used to interpret any resulting data. Web services are increasingly popular since it is relatively easy to integrate them into applications to extend the features offered to end users. However, web service requests are also increasingly complex. For example, many web services require content from various sources to be mashed-up in order to provide a response. Accordingly, the processing of web service requests often requires significant resources, as well as a significant amount of time.

SUMMARY

A method for servicing web service requests using parallel agile web services includes sending, with a web content management server, each of a plurality of jobs requiring execution in order to service a received web service request to one of a plurality of slave web services configured to execute the plurality of jobs in parallel. A response from each of the plurality of slave web services is received with the web content management server. A web service response is generated, with the web content management server, based on the received responses. The generated web service response is provided, with the web content management server, in response to the received web service request A non-transitory computer readable medium having stored thereon instructions for servicing web service requests using parallel agile web services comprising machine executable code which when executed by a processor, causes the processor to perform steps including sending each of a plurality of jobs requiring execution in order to service a received web service request to one of a plurality of slave web services configured to execute the plurality of jobs in parallel. A response from each of the plurality of slave web services is received. A web service response is generated based on the received responses. The generated web service response is provided in response to the received web service request.

A web content management server device includes a processor coupled to a memory and configured to execute programmed instructions stored in the memory including sending each of a plurality of jobs requiring execution in order to service a received web service request to one of a plurality of slave web services configured to execute the plurality of jobs in parallel. A response from each of the plurality of slave web services is received. A web service response is generated based on the received responses. The generated web service response is provided in response to the received web service request.

This technology provides a number of advantages including methods, non-transitory computer readable medium, and devices that facilitate more efficient and effective processing of web service requests using parallel slave web services to retrieve content required to generate a web service response. The parallel slave web services advantageously run in an emulated JavaScript environment which is capable of executing other web service functionality implemented using JavaScript. Accordingly, with this technology, web service requests can be processed by an increased number of devices, including mobile devices and tablets with special requirements, and in relatively less time.

BRIEF DESCRIPTION OF THE DRAWINGS

FIG. 3 is a flow chart of an exemplary method for processing with parallel agile web service jobs received from a master web service;

FIG. 4 is an exemplary code fragment of an exemplary master web service configured to perform the exemplary method of FIG. 2;

FIG. 5 is an exemplary code fragment of an exemplary slave web service configured to perform the exemplary method of FIG. 3; and FIG. 6 is an exemplary configuration file defining the role of an exemplary slave web service.

DETAILED DESCRIPTION

Figure 1:
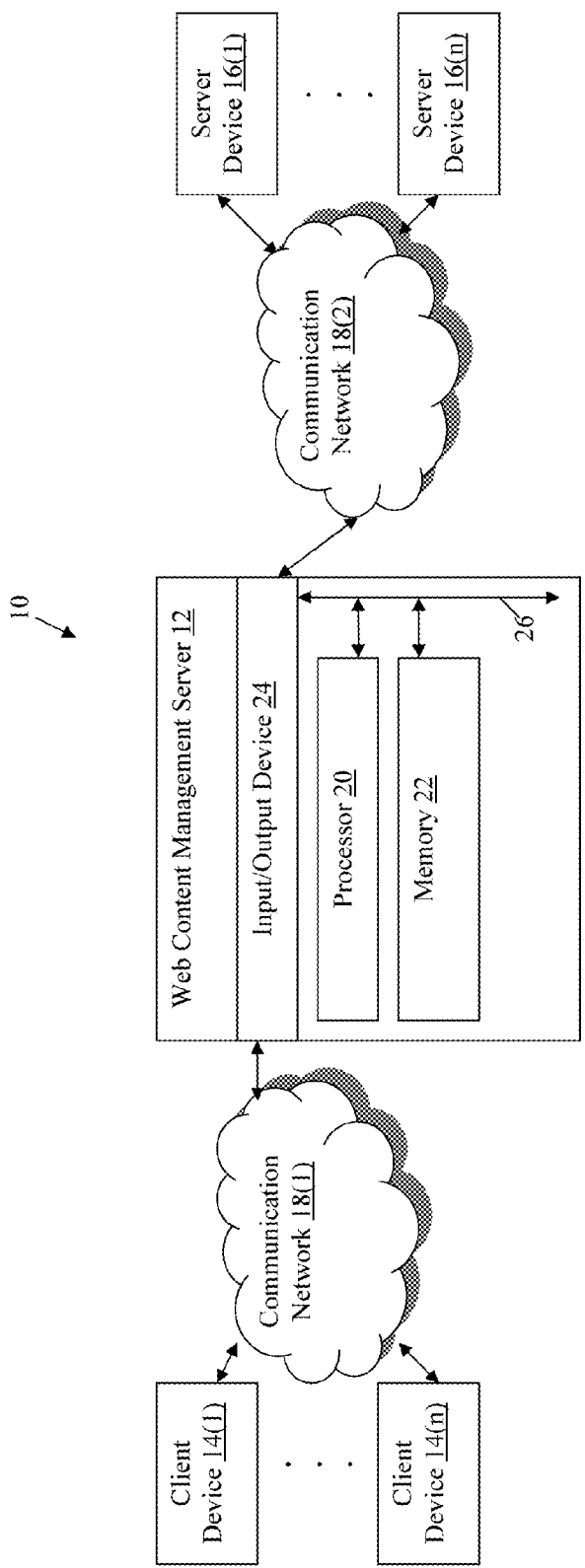
FIG. 1 is a block diagram of an environment with an exemplary web content management server.

An exemplary network environment 10 with a web content management server 12 coupled to client devices 14(1)-14(n) and server devices 16(1)-16(n) is illustrated in FIG. 1. In this example, the web content management server 12, client devices 14(1)-14(n), and server devices 16(1)-16(n) are coupled together by communication networks 18(1)-18(2), although other numbers and types of systems, devices, and/or elements in other configurations or network topologies can also be used. This technology provides a number of advantages including methods, non-transitory computer readable medium, and devices that facilitate more efficient and effective processing of web service requests using parallel slave web services to retrieve content required to generate a web service response.

The web content management server 12 is coupled to the client devices 14(1)-14(n) by the communication network

18(1) which can include one or more local area network(s) (LANs) and/or wide area network(s) (WANs). In this example, the web content management server 12 is further coupled to the server devices 16(1)-16(n) by the communication network 18(2), which may also include one or more LANs and/or WANs. Other network devices configured to generate, send, and receive network communications and coupled together via other topologies can also be used. While not shown, the network environment 10 also may include additional network components, such as routers, switches and other devices, which are well known to those of ordinary skill in the art and thus will not be described here.

The web content management server 12 may perform any number of functions including optimizing content retrieved from the server devices 16(1)-16(n) for display on the client devices 14(1)-14(n), for example. In this example the web content management server 12 includes a processor 20, a memory 22, and an input/output system 24, which are coupled together by a bus 26 or other link, although other numbers and types of components, parts, devices, systems, and elements in other configurations and locations can be used.

The processor 20 in the web content management server 12 executes a program of stored instructions one or more aspects of the present invention, as described and illustrated by way of the embodiments herein, although the processor 20 could execute other numbers and types of programmed instructions. The processor 20 of the web content management server 12 may comprise one or more central processing units or general purpose processors with one or more processing cores, for example.

The memory 22 in the web content management server 12 stores these programmed instructions for one or more aspects of the present invention, as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor 20, can be used for the memory 22 in the web content management server 12.

The input/output system 24 in the web content management server 12 is used to operatively couple and communicate between the web content management server 12, client devices 14(1)-14(n), and server devices 16(1)-16(n), which are all coupled together via the communication networks 18(1)-18(2), although other types and numbers of communication networks or systems with other types and numbers of connections and configurations to other devices and elements can also be used. By way of example only, the communication networks 18(1)-18(2) can use TCP/IP over Ethernet and industry-standard protocols, including hypertext transfer protocol (HTTP), secure HTTP (HTTPS), wireless application protocol (WAP), and/or SOAP, although other types and numbers of communication networks, such as a direct connection, modems and phone lines, e-mail, and wireless and hardwire communication technology, each having their own communications protocols, can be used.

The client devices 14(1)-12(n) enable a user to request, receive, and interact with applications, web services, and content hosted by the server devices 16(1)-16(n) through the web content management server 12 and using the communication network 18(1), although one or more of the client devices 14(1)-14(n) could access content and utilize other types and numbers of applications from other sources and could provide a wide variety of other functions for the user. In some examples, the client devices 14(1)-14(n) comprise mobile devices with Internet access that enable web pages and other content stored by the server devices 16(1)-16(n) to be retrieved and rendered. By way of example only, the client devices 14(1)-14(n) can be smart phones, personal digital assistants, tablets, or computers.

Each of the client devices 14(1)-14(n) includes a processor, a memory, an input device, a display device, and an input/output system, which are coupled together by a bus or other link, although one or more of client devices 14(1)-14(n) can include other numbers and types of components, parts, devices, systems, and elements in other configurations. The processor in each of the client devices 14(1)-14(n) can execute a program of instructions stored in the memory the client device 14(1)-14(n) for one or more aspects of the present invention, as described and illustrated herein, although the processor could execute other numbers and types of programmed instructions.

The input device in each of the client devices 14(1)-14(n) can be used to input selections, such as a request for a particular web page or other content stored by one or more of the server devices 16(1)-16(n), although the input device could be used to input other types of requests and data and interact with other elements. The input device can include keypads, touch screens, and/or vocal input processing systems, although other types and numbers of input devices can also be used.

The display device in each of the client devices 14(1)-14(n) can be used to show data and information to the user, such as web pages and other content retrieved from the server devices 16(1)-16(n) by way of example only. The display device in each of the client devices 14(1)-14(n) can be a mobile phone screen display, although other types and numbers of displays could be used depending on the particular type of client device.

The input/output system in each of the client devices 14(1)-14(n) can be used to operatively couple and communicate between the client devices 14(1)-14(n), the web content management server 12, and the server devices 16(1)-16(n) over the communication networks 18(1)-18(2).

Each of the server devices 16(1)-16(n) provides content including web pages and web applications for use by one or more of the client devices 14(1)-14(n) via the web content management server 12, although the server devices 16(1)-16(n) can provide other numbers and types of content and perform other functions. Each of the server devices 16(1)-16(n) can include a processor, a memory, and an input/output system, which are coupled together by a bus or other link, although each of the server devices 16(1)-16(n) can have other numbers and types of components, parts, devices, systems, and elements in other configurations.

The processor in each of the server devices 16(1)-16(n) executes a program of instructions stored in the memory of the server devices 16(1)-16(n) for one or more aspects of the present invention, as described and illustrated by way of the embodiments herein, although the processor could execute other numbers and types of programmed instructions.

The input/output system in each of the server devices 16(1)-16(n) is used to operatively couple and communicate between the server devices 16(1)-16(n), the web content management server 12, and the client devices 14(1)-14(n) via the communication networks 18(1)-18(2).

Although embodiments web content management server 12, the client devices 14(1)-14(n), and the server devices 16(1)-16(n) are described and illustrated herein, each of the web content management server 12, the client devices 14(1)-14(n), and the server devices 16(1)-16(n) can be implemented on any suitable computer apparatus or computing device. It is to be understood that the apparatuses and devices of the embodiments described herein are for exemplary purposes, as many variations of the specific hardware and software used to implement the embodiments are possible, as will be appreciated by those skilled in the relevant art(s).

Furthermore, each of the devices of the embodiments may be conveniently implemented using one or more general purpose computers, microprocessors, digital signal processors, and micro-controllers, programmed according to the teachings of the embodiments, as described and illustrated herein, and as will be appreciated by those ordinary skill in the art.

In addition, two or more computing apparatuses or devices can be substituted for any one of the devices in any embodiment described herein. Accordingly, principles and advantages of distributed processing, such as redundancy and replication also can be implemented, as desired, to increase the robustness and performance of the devices of the embodiments. The embodiments may also be implemented on computer apparatuses or devices that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as one or more non-transitory computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

Figure 2:
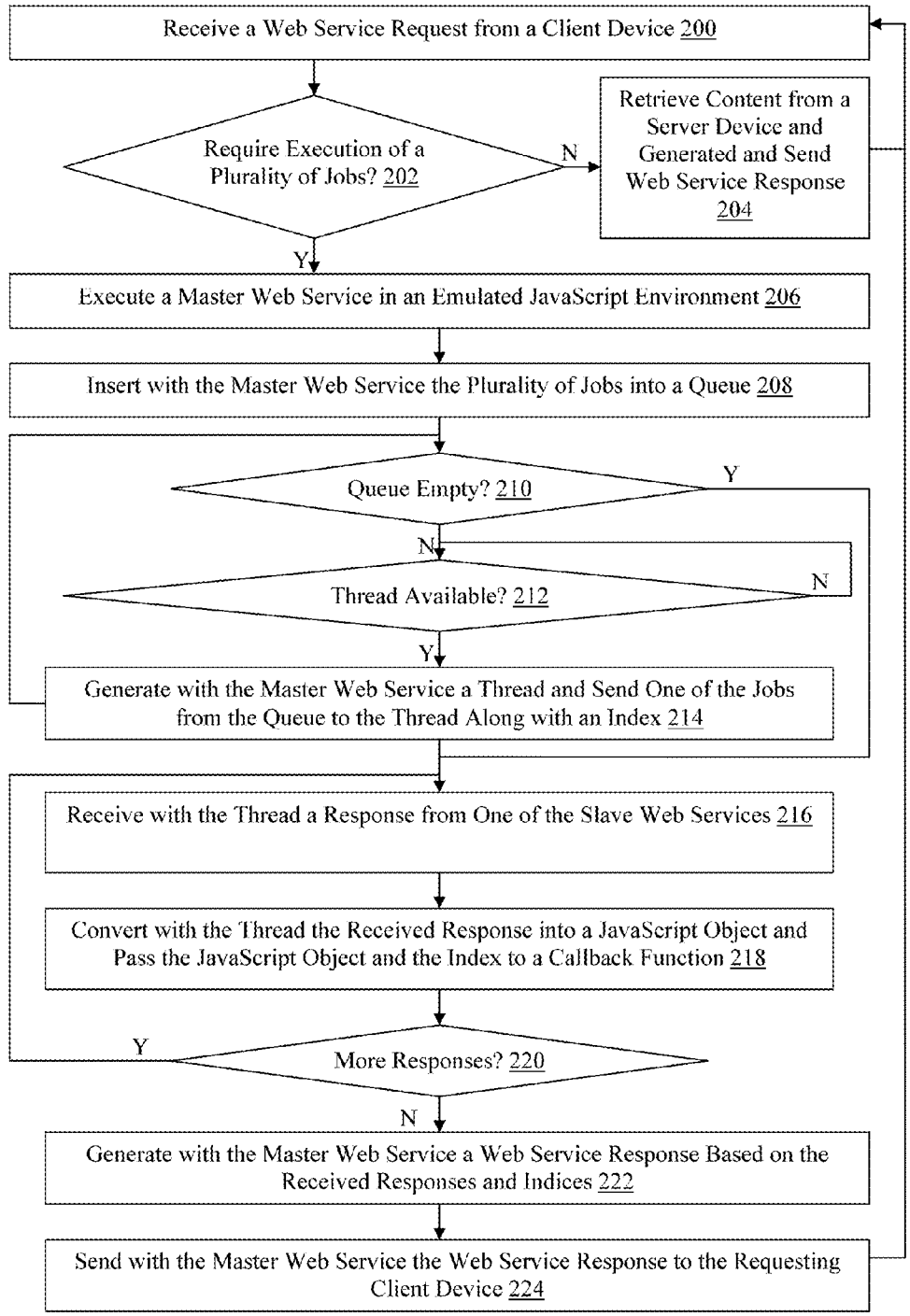
FIG. 2 is a flow chart of an exemplary method for processing web service requests with a master web service using parallel agile web services.

An exemplary method for servicing web service requests using parallel agile web services will now be described with reference to FIGS. 1-6. Referring more specifically to FIG. 2, a flow chart of an exemplary method for processing web service requests with a master web service using parallel agile web services is illustrated. In this example, in step 200, the web content management server 12 receives a web service request from one of the client devices 14(1)-14(n). The web service request can be for social media posts, blog summaries, or any other content stored by one or more of the server devices 16(1)-16(n), for example. In the example described and illustrated herein, the received web service request is for the last five social media (e.g., Facebook®) posts for each of twenty users of a social media service associated with a user (e.g., Facebook® friends) of the requesting one of the client devices 14(1)-14(n).

In step 202, the web content management server 12 determines whether the request received in step 200 requires execution of a plurality of jobs in order to service the request. In the example described herein, the web content management server 12 may determine that the request requires execution of twenty jobs, one for each of the users for which the last five posts have been requested. In this example, the social media service will have to be called twenty times in order to retrieve the last five posts for each of the twenty users identified in the received web service request.

In other examples, the received web service request may be for the last ten posts for only one user of the social media service, in which case the web content management server 12 may determine in step 202 that a plurality of jobs are not required in order to service the request. The web content management server 12 can be configured by an administrator, for example, to determine that a received web service request requires execution of a plurality of jobs based on any criteria or type of analysis of the web service request.

Additionally, an administrator of the web content management server 12 can define a threshold number of jobs requiring execution in order to satisfy the condition in step 202. Alternatively, the condition in step 202 can be satisfied whenever the web content management server 12 determines more than one job must be executed in order to service the received web service request. If the web content management server 12 determines in step 202 that the web service request received in step 200 does not require execution of a plurality of jobs, then the web content management server 12 proceeds to step 204.

In step 204, the web content management server 12 retrieves content from one or more of the server devices 16(1)-16(n) and generates and sends a web service response to the requesting one of the client devices 14(1)-14(n). Accordingly, if the web content management server 12 determines a plurality of jobs are not required in order to service the received web service request, then the web service request is processed based on one or more sequential requests for content sent by the web content management server 12 to the server devices 16(1)-16(n) on behalf of the requesting one of the client devices 14(1)-14(n). Subsequent to servicing the web service request, or in parallel, the web content management server 12 may retrieve another web service request from one of the client devices 14(1)-14(n) in step 200.

Referring back to step 202, if the web content management server determines that the web service request received in step 200 does require execution of a plurality of jobs, then the web content management server 12 proceeds to step 206. In step 206, the web content management server 12 executes a master web service in an emulated JavaScript environment, although other types of environments could be used. The emulated JavaScript environment can be generated, for example, as described and illustrated in U.S. patent application Ser. No. 12/802,670, entitled "Methods for Utilizing a JavaScript Emulator in a Web content management server and Devices Thereof," which is incorporated by reference herein in its entirety, although other methods of generating an emulated JavaScript environment can also be used.

In step 208, the master web service executed by the web content management server 12 inserts the plurality of jobs requiring execution in order to service the web service request into a queue. The queue can be maintained in the memory 22 for example, although the queue can also be stored elsewhere. In the example described earlier, the master web service inserts the twenty jobs that require a call to the social media service for the last five social media posts for one of the twenty specified users.

In step 210, the master web service executed by the web content management server 12 determines whether the queue is empty. In a first iteration, the web content management server 12 will determine in step 210 that the queue is not empty. However, in subsequent iterations, all of the jobs may have been sent by the master web service to threads configured to request execution of each of the jobs by one of a plurality of slave web services resulting in an empty queue. If the master web service executed by the web content management server 12 determines that the queue is not empty, then the No branch is taken to step 212.

In step 212, the master web service executed by the web content management server 12 determines whether a thread is available to receive one of the jobs stored in the queue. In a first iteration, the web content management server 12 will determine in step 212 that a thread is available. However, in a subsequent iterations, slave web services may be executing jobs sent by each of the threads and a thread may not be therefore be available.

The total number of slave web services can be established by an administrator of the web content management server 12, for example. The number of slave web services can be based on a number of threads or processes the system administrator wants to allow the web content management server 12 to execute concurrently, although the number of slave web services can be based on any other criteria. Additionally, web services can be designated as master or slave based on a configuration established by an administrator of the web content management server 12, as described and illustrated in more detail later with reference to FIG. 6. Accordingly, if the master web service executed by the web content management server 12 determines that a slave web service is available, then the Yes branch is taken to step 214.

In step 214, the master web service executed by the web content management server 12 generates a thread and sends one of the jobs from the queue to the thread along with an index. The thread is configured to request execution of the one of the jobs by one of the available slave web services. The index will be returned to the master web service context and used to reorder the content received from the slave web services, as described and illustrated in more detail later with reference to step 222. Upon sending one of the jobs from the queue, the master web service again determines whether the queue is empty in step 210.

Accordingly, in this example, steps 210-214 are performed for each of the jobs and the master web service proceeds to send a job from the queue to a generated thread configured to request execution of the job from one of the slave web services until the master web service determines that the queue is empty in step 210 or that no more threads are available in step 212. For example, assuming that none of the slave web services have processed a job as requested by one of the threads, in this example, the master web service will determine in an eleventh iteration of step 212 that a thread is not available.

If the master web service determines that a thread is not available, then the No branch is taken from step 212 back to step 212 and the master web service effectively waits until it determines a thread has finished processing a response sent by an associated slave web service, and is available to receive another job, prior to sending one of the jobs from the queue to the generated thread in step 214. Subsequent to generating a thread and sending another one of the jobs and an index to the generated thread in step 214, the master web service proceeds back to step 210, as described and illustrated earlier. Upon the master web service determining, in step 210, that the queue is empty, the Yes branch is taken to step 216.

In step 216, one of the threads generated by the master web service executed by the web content management server 12 receives a response from one of the slave web services. In this example, the response is a JavaScript Object Notation (JSON) response, although the response can be any type of response. The response includes content obtained from one or more of the server devices 16(1)-16(n) that satisfies the job the slave web service was requested to execute by the thread, as described and illustrated in more detail later with reference to FIG. 3.

In step 218, the one of the threads generated by the master web service executed by the web content management server 12 converts the received response into a JavaScript object and passes the JavaScript object and an index to a callback function executed in the master web service context, although the response and/or index can be converted and/or passed in other manners. The index passed in step 218 is the same index sent by the master web service to the one of the threads in step 214. In this example, the thread generated by the master web service converts the received response by using the JSON.parse( ) function, although other methods of converting the response received from the slave web service can be used.

In step 220, the master web service executed by the web content management server 12 determines whether there are more responses required to satisfy the web service request received in step 200. The master web service can determine whether there are more responses based on whether it has received a response from the threads corresponding to each of the indices sent along with one of the jobs in step 214. Alternatively, one or more of steps 210-220 can be performed by the master web service within the context of a function call such that control will only return to the master web service context when all of the slave web services have returned a response which is received by the master web service in step 216.

If the master web service determines in step 220 that more responses are required to satisfy the web service requested received in step 200, then the Yes branch is taken to step 216. Steps 216-220 are repeated until the master web service determines in step 220 that no more responses from the slave web services are required. In this particular example, steps 216-220 will be repeated twenty times or one time for each of the jobs sent to the threads in step 214. If the master web service determines in step 220 that no more responses are required, then the No branch is taken to step 222.

In this example, steps 216-220 proceed in parallel with steps 210-214 such that a response may be received by the master web service from one of the threads prior to the queue being empty and all of the jobs being sent to one of the threads. Since the slave web services process the jobs in parallel, the responses from the slave web services can be received from the threads by the master web service in any order, generally depending on the time required for each slave web service to complete its job and retrieve the associated content from one or more of the server devices 16(1)-16(n).

In step 222, the master web service executed by the web content management server 12 generates a web service response based on the responses received in step 216, as converted in step 218, and the indices. As described and illustrated earlier, the threads can optionally pass the converted responses to a callback function in the master web service context in step 218. The callback function can be configured to store the JavaScript objects in a common location, optionally as associated with a corresponding one of the indices, extract one or more properties of the JavaScript objects, and/or perform any number of other functions.

Accordingly, upon control returning to the master web service context, the master web service can generate a response to the web service request received in step 200 by retrieving the JavaScript objects from the common location, for example. Once retrieved, the master web service can order the JavaScript objects, and/or content included therein, based on the index associated with each of the JavaScript objects, to formulate the web service response.

In some examples, a plurality of different callback functions configured to execute different functionality can be provided in the master web service context and used by a thread depending on the job sent to the thread by the master web service. For example, the master web service may send a first subset of the threads jobs associated with a first social media service and a second subset of the threads jobs associated with a second social media service. In this example, the master web service may provide, and the threads may pass JavaScript objects and indices to, different callback functions depending on the job received from the master web service in step 214, and the master web service can thereby mash up converted responses from the various slave web services to generate a web service response.

In step 224, the master web service executed by the web content management server 12 sends the generated web service response to the requesting one of the client device 14(1)-14(n). Upon sending the web service response with the master web service, or during any of steps 202-224, the web content management server 12 can receive another web service request from one of the client devices 14(1)-14(n) in step 200.

Referring more specifically to FIG. 3, a flow chart of an exemplary method for processing with parallel agile web service jobs received from a master web service is illustrated. In this example, in FIG. 300, one of the slave web services executed by the web content management server 12 receives one of the jobs, such as from a thread generated by the master web service, as described and illustrated earlier with reference to step 214 of FIG. 2.

In step 302, the slave web service executed by the web content management server 12 retrieves content satisfying the job received in step 300 from one or more of the server devices 16(1)-16(n). Accordingly, in this example, the slave web service retrieves the last five posts for one of the users of the social media service specified in the received job. The retrieved content can be HTML web pages, XML documents, RESTful web services, for example, or any other type of content.

In step 304, the slave web service executed by the web content management server 12 generates a response including the retrieved content. In this example, the response is a JSON response, which can be generated using the JSON-.stringify( ) function, for example, although other methods of generating a JSON response and other types of responses can also be used.

In step 306, the slave web service executed by the web content management server 12 sends the response to the thread from which the job was received. After processing the response received from the slave web service, the thread from which the job was received becomes available to receive another job, as described and illustrated earlier with reference to step 212 of FIG. 2.

In this example, steps 300-306 are performed in parallel for each of the slave web services receiving one of the jobs from a thread generated by the master web service in step 214 of FIG. 2. By breaking the web service request into a plurality of jobs, and processing the jobs in parallel with a plurality of slave web services, the time required for the web content management server 12 to generate a response to the web service request can be reduced.

Referring more specifically to FIG. 4, an exemplary code fragment 400 of an exemplary master web service configured to perform the exemplary method of FIG. 2 is illustrated. In this example, the master web service uses "counter" and "generic" callback functions, as described and illustrated earlier with reference to step 218 of FIG. 2, depending on whether a response is successfully or unsuccessfully, respectively, received by a thread from one of the slave web services. The "counter" callback function takes the index of a job and a JavaScript object, generated by a thread from a response received from slave web service, as parameters.

The total number of threads is established as "10" in this example which corresponds to the number of slave web services currently processing or available to process a job at any time. Additionally, the executeBatch( ) function can be used in this example to perform steps 216-220. Upon completion of the executeBatch( ) function, control returns to the master web service context to generate the web service response, as described and illustrated earlier with reference to step 222 of FIG. 2. Accordingly, the master web service will automatically determine whether there are more responses in step 220 of FIG. 2 based on whether the executeBatch( ) function has completed its execution.

Referring more specifically to FIG. 5, an exemplary code fragment 500 of an exemplary slave web service configured to perform the exemplary method of FIG. 3 is illustrated. Referring more specifically to FIG. 6, an exemplary configuration file 600 defining the role of the exemplary slave web service 500 is illustrated. In this example, the slave web service 500 called catalogue-p-plp is assigned the role of "slave." The configuration file 600 can be established by an administrator of the web content management server 12 and can be stored in the memory 22, for example, as described and illustrated earlier. Additionally, a corresponding configuration file can be established, or the same configuration file can be used, to define the role of a plurality of master and/or slave web services executable by the web content management sever 12.

With this technology, web service requests, such as requests requiring a large amount of content and/or content from a number of disparate sources, for example, can be divided into a plurality of jobs which are processed in parallel by slave agile web services to reduce the overall amount of time required to generate a response to the web service request. Accordingly, portions of content required to satisfy a web service request can be retrieved in parallel and mashed-up to generate a web service response. Advantageously, the process can utilize JavaScript executed in an emulated environment on behalf of client devices, including mobile computing or other devices with special requirements that may otherwise be unable to process such content.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for servicing web service requests using parallel agile web services, the method implemented by one or more web content management servers and comprising:

determining when a web service request received from a client device via one or more communication networks requires execution of a plurality of jobs and when the determination indicates that the web service request requires execution of the jobs:

executing a master web service in an emulated JavaScript environment;

determining when a number of the jobs exceeds a maximum number of slave web services executable in parallel and when the determination indicates that the number of jobs exceeds the maximum number of slave web services executable in parallel:

inserting the jobs into a queue;

sending, by the master web service, a plurality of generated indices and a subset of the jobs corresponding to the maximum number of slave web services executable in parallel to a plurality of threads from the queue, the threads configured to request, in parallel, execution of the subset of the jobs by a plurality of slave web services configured to obtain content, via another one or more communication networks, from the server devices and return responses, wherein the threads are further configured to convert the responses into JavaScript objects to facilitate manipulation of the responses in the emulated JavaScript environment;

receiving, by the master web service, the JavaScript objects and at least one of the indices from the threads, wherein the JavaScript objects comprise the content obtained by the slave web services from the server devices;

repeating, by the master web service, the sending and receiving for one or more of the jobs remaining in the queue until the queue is empty;

ordering, by the master web service, the content in the JavaScript objects received from the threads based on an associated one or more of the indices received from the threads and generating a web service response comprising the ordered content; and providing the web service response to the client device via the one or more communication networks and in response to the web service request.

2. The method of claim 1, further comprising:
determining, by the master web service and based on the indices, when no more responses are required from the threads to satisfy the web service request; and
ordering, by the master web service, the content in the JavaScript objects received from the threads, when the determining indicates that no more responses are required from the threads to satisfy the web service request.

3. The method of claim 1 wherein the slave web services are further configured to convert the content into one or more JavaScript Object Notation (JSON) responses and return the JSON responses to the threads.

4. The method of claim 1, further comprising passing, by the threads, the JavaScript objects and the indices to a callback function in a context associated with the master web service.

5. A non-transitory computer readable medium having stored thereon instructions for servicing web service requests using parallel agile web services comprising machine executable code which when executed by one or more processors, causes the processors to:

determine when a web service request received from a client device via one or more communication networks requires execution of a plurality of jobs and when the determination indicates that the web service request requires execution of the jobs:

execute a master web service in an emulated JavaScript environment;

determine when a number of the jobs exceeds a maximum number of slave web services executable in parallel and when the determination indicates that the number of jobs exceeds the maximum number of slave web services executable in parallel:

insert the jobs into a queue;

send, by the master web service, a plurality of generated indices and a subset of the jobs corresponding to the maximum number of slave web services executable in parallel to a plurality of threads from the queue, the threads configured to request, in parallel, execution of the subset of the jobs by a plurality of slave web services configured to obtain content, via another one or more communication networks, from the server devices and return responses, wherein the threads are further configured to convert the responses into JavaScript objects to facilitate manipulation of the responses in the emulated JavaScript environment;

receive, by the master web service, the JavaScript objects and at least one of the indices from the threads, wherein the JavaScript objects comprise the content obtained by the slave web services from the server devices;

repeat, by the master web service, the sending and receiving for one or more of the jobs remaining in the queue until the queue is empty;

order, by the master web service, the content in the JavaScript objects received from the threads based on an associated one or more of the indices received from the threads and generate a web service response comprising the ordered content; and provide the web service response to the client device via the one or more communication networks and in response to the web service request.

6. The medium of claim 5, wherein the machine executable code, when executed by the processors, further causes the processors to:
determine, by the master web service and based on the indices, when no more responses are required from the threads to satisfy the web service request; and
order, by the master web service, the content in the JavaScript objects received from the threads, when the determining indicates that no more responses are required from the threads to satisfy the web service request.

7. The medium of claim 5, wherein the slave web services are further configured to convert the content into one or more JavaScript Object Notation (JSON) responses and return the JSON responses to the threads.

8. The medium of claim 5, wherein the machine executable code, when executed by the processors, further causes the processors to pass, by the threads, the JavaScript objects and the indices to a callback function in a context associated with the master web service.

9. A web content management server device, comprising a memory comprising programmed instructions stored in the memory and a processor coupled to the memory and configured to execute the programmed instructions stored in the memory to:

determine when a web service request received from a client device via one or more communication networks requires execution of a plurality of jobs and when the determination indicates that the web service request requires execution of the jobs:

execute a master web service in an emulated JavaScript environment;

determine when a number of the jobs exceeds a maximum number of slave web services executable in parallel and when the determination indicates that the number of jobs exceeds the maximum number of slave web services executable in parallel:

insert the jobs into a queue;

send, by the master web service, a plurality of generated indices and a subset of the jobs corresponding to the maximum number of slave web services executable in parallel to a plurality of threads from the queue, the threads configured to request, in parallel, execution of the subset of the jobs by a plurality of slave web services configured to obtain content, via another one or more communication networks, from the server devices and return responses, wherein the threads are further configured to convert the responses into JavaScript objects to facilitate manipulation of the responses in the emulated JavaScript environment;

receive, by the master web service, the JavaScript objects and at least one of the indices from the threads, wherein the JavaScript objects comprise the content obtained by the slave web services from the server devices;

repeat, by the master web service, the sending and receiving for one or more of the jobs remaining in the queue until the queue is empty;

order, by the master web service, the content in the JavaScript objects received from the threads based on an associated one or more of the indices received from the threads and generate a web service response comprising the ordered content; and provide the web service response to the client device via the one or more communication networks and in response to the web service request.

10. The device of claim 9, wherein the processor is further configured to execute the programmed instructions stored in the memory to:

determine, by the master web service and based on the indices, when no more responses are required from the threads to satisfy the web service request; and order, by the master web service, the content in the JavaScript objects received from the threads, when the determining indicates that no more responses are required from the threads to satisfy the web service request.

11. The device of claim 9, wherein the slave web services are further configured to convert the content into one or more JavaScript Object Notation (JSON) responses and return the JSON responses to the threads.

12. The device of claim 9, wherein the processor is further configured to execute the programmed instructions stored in the memory to pass, by the threads, the JavaScript objects and the indices to a callback function in a context associated with the master web service.

* * * * *